(12) United States Patent
Matheney

(10) Patent No.: US 7,231,686 B1
(45) Date of Patent: Jun. 19, 2007

(54) VACUUM CLEANER SYSTEM FOR MOTOR VEHICLE

(76) Inventor: Mary Ann Matheney, 1305 Lincoln Way, Fairmont, WV (US) 26554

( * ) Notice: Subject to any disclaimer, the term of this patent is extended or adjusted under 35 U.S.C. 154(b) by 876 days.

(21) Appl. No.: 10/612,470

(22) Filed: Jul. 3, 2003

(51) Int. Cl.
*B60S 1/64* (2006.01)

(52) U.S. Cl. .......................... 15/313; 15/315

(58) Field of Classification Search .............. 15/301, 15/302, 314, 315, 320, 323
See application file for complete search history.

(56) References Cited

U.S. PATENT DOCUMENTS

| | | | |
|---|---|---|---|
| 1,455,933 A * | 5/1923 | Peterman ................. | 15/313 |
| 1,809,337 A * | 6/1931 | Hall ......................... | 15/323 |
| 2,169,734 A | 8/1939 | Hoppenstand | |
| 2,287,602 A * | 6/1942 | Campbell ................. | 15/313 |
| D162,312 S | 3/1951 | Karstadt | |
| 2,972,160 A | 2/1961 | Hahn | |
| 4,062,608 A | 12/1977 | Pierce | |
| D272,570 S | 2/1984 | Van Dyken et al. | |
| D277,516 S | 2/1985 | Hayden et al. | |
| 5,074,483 A | 12/1991 | Wang | |
| 5,156,242 A | 10/1992 | Ditzig | |
| 5,189,753 A | 3/1993 | Sousa et al. | |
| 5,230,481 A | 7/1993 | Wheeler et al. | |
| 5,402,814 A | 4/1995 | Odom | |
| 5,829,091 A | 11/1998 | Ingram et al. | |
| 2004/0107528 A1* | 6/2004 | LeClear et al. ........... | 15/313 |
| 2004/0134013 A1* | 7/2004 | Slone ....................... | 15/313 |
| 2005/0011035 A1* | 1/2005 | Rukavina et al. ........ | 15/313 |

FOREIGN PATENT DOCUMENTS

FR    2689474 A1 * 10/1993
JP    08104205 A  *  4/1996

* cited by examiner

*Primary Examiner*—Terrence R. Till
(74) *Attorney, Agent, or Firm*—Donald R. Schoonover

(57) ABSTRACT

A vacuum cleaner system is mounted inside the passenger compartment of a motor vehicle and includes a hose that is retractable into a housing for storage and a power cord that is also retractable into the housing for storage and which also includes a connector for connecting the motor of the system to the power of the vehicle via a cigarette lighter receptacle of the motor vehicle.

2 Claims, 1 Drawing Sheet

VACUUM CLEANER SYSTEM FOR MOTOR VEHICLE

BACKGROUND OF THE INVENTION

1. Field of the Invention

Figure 1:
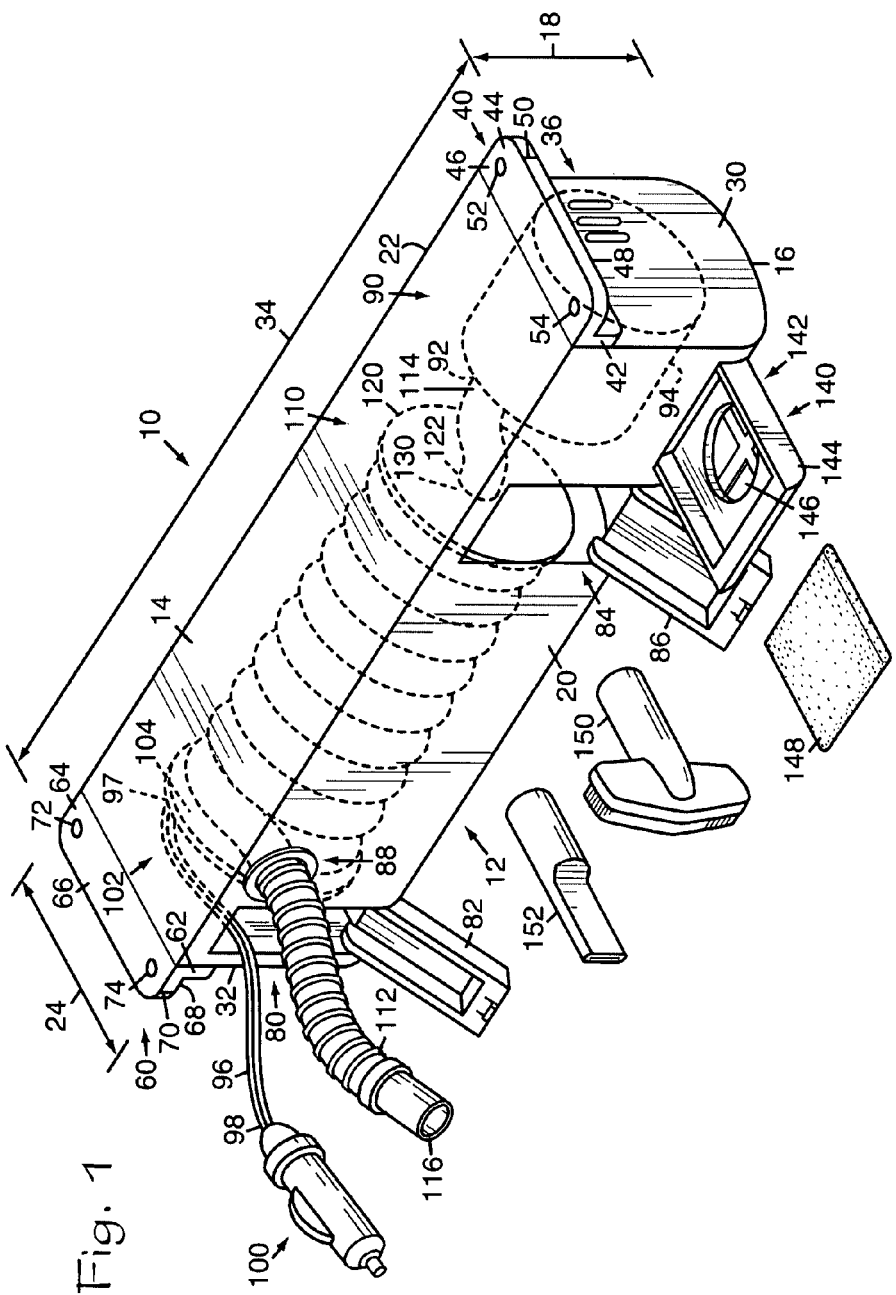

The present invention relates to the general art of motor vehicles, and to the particular field of accessories for motor vehicles.

2. Discussion of the Related Art

It has been found that, in recent times, people are spending more and more time in their cars. It is not unusual for someone to spend several hours a day in his or her automobile. People spend hours commuting to and from work, running errands, driving children to and from school and after-school activities, and the like.

Spending so much time in a car makes cleanliness of the car an issue. This is especially true if children are in the car as the car may become cluttered. The possibility of cluttering the interior of the car increases as more time is spent in the vehicle. Likewise, the annoyance of such clutter generally increases as more time is spent in the vehicle.

Therefore, there is a need for a means to clean the interior of a motor vehicle.

Many car wash establishments provide vacuum cleaner systems, and people can carry their home vacuum cleaner to their car to clean the car when desired. While effective, these methods are inefficient and cumbersome, and may not even be available when the vehicle owner must clean up a spill or the like.

Therefore, there is a need for a means to efficiently clean the interior of a motor vehicle.

As mentioned above, presently available car cleaning systems are not always accessible when needed. For example, if a passenger in a motor vehicle spills food in the vehicle, it would be most efficient to be able to immediately remove that spilled food. However, presently, the vehicle generally must be driven to a location having vacuum cleaner equipment in order to clean that spill. This is inconvenient and cumbersome.

Therefore, there is a need for a means to efficiently clean the interior of a motor vehicle, no matter when or where the cleanup is effected.

PRINCIPAL OBJECTS OF THE INVENTION

It is a main object of the present invention to provide a means to clean the interior of a motor vehicle.

It is another object of the present invention to provide a means to efficiently clean the interior of a motor vehicle.

It is another object of the present invention to provide a means to efficiently clean the interior of a motor vehicle, no matter when or where the cleanup is effected.

SUMMARY OF THE INVENTION

These, and other, objects are achieved by a vacuum cleaner system for use in a motor vehicle which comprises a housing unit that is adapted to be mounted in a passenger compartment of a motor vehicle; a vacuum system located inside the housing unit and including a fluid inlet and a fluid outlet; a hose fluidically connected to the inlet of the vacuum system and extending out of the housing unit; a hose winding mechanism located inside the housing unit and which includes a hose biasing mechanism that automatically winds the hose into the housing unit when the hose is released, the hose being pulled out of the housing unit against the bias of the hose biasing mechanism; a power cord electrically connected to the vacuum system and which extends out of the housing unit and which includes a plug that is sized and shaped to be received in a cigarette lighter receptacle of the motor vehicle to electrically connect the vacuum system to a power source of the motor vehicle via the cigarette lighter receptacle; a power cord winding mechanism located inside the housing unit and which includes a power cord biasing mechanism that automatically winds the power cord into the housing unit when the power cord is released, the power cord being pulled out of the housing unit against the bias of the power cord biasing mechanism; and a filter unit mounted on the housing unit and fluidically connected to the fluid outlet of the vacuum system; and a plurality of vacuum cleaner attachments each of which is adapted to be fluidically and releasably mounted on the hose.

The vacuum system embodying the present invention thus is neatly stored inside a passenger compartment of a motor vehicle to be available for use whenever necessary and/or convenient and/or wherever necessary and/or convenient. The system of the present invention is quickly and easily stored after use making the system very convenient.

BRIEF DESCRIPTION OF THE DRAWING FIGURE

The FIGURE shows a perspective view of the elements included in the vacuum system embodying the present invention.

DETAILED DESCRIPTION OF THE PREFERRED EMBODIMENT

Other objects, features and advantages of the invention will become apparent from a consideration of the following detailed description and the accompanying drawings.

Referring to the FIGURE, it can be understood that the present invention is embodied in a vacuum system 10 for cleaning a motor vehicle. Vacuum cleaner system 10 is located on the motor vehicle and thus is available for use when and where needed.

Vacuum cleaner system 10 includes a hollow housing unit 12, which includes a planar first wall 14, a second wall 16, and a thickness dimension 18 which extends between the first wall 14 and the second wall 16. Housing unit 10 further includes a first side wall 20, a second side wall 22, and a width dimension 24 which extends between the first side wall 20 and the second side wall 22. Housing unit 10 further includes a first end wall 30, a second end wall 32, and a length dimension 34 which extends between the first end wall 30 and the second end wall 32. A plurality of vent holes, such as vent hole 36, are defined through the first end wall 30.

A first L-shaped mounting flange 40 has a first leg 42 which is fixed to the first end wall 30 of the housing unit 12 and a second leg 44 which extends away from the first end wall 30 in the direction of the length dimension 34 of the housing unit 12. Second leg 44 of the first L-shaped mounting flange 40 has a first surface 46 located to be co-planar with the first wall 14 of the housing unit 12, a second surface 48 spaced apart from the first surface 46 of the second leg 44 of the first L-shaped mounting flange 40 in the direction of the thickness dimension 18 of the housing unit 12. A thickness dimension 50 extends between the first surface 46 of the second leg 44 of the first L-shaped mounting flange 40 and the second surface 48 of the second leg 44 of the first L-shaped mounting flange 40. Two fastener accommodating holes 52 and 54 are defined through the second leg 44 of the first L-shaped mounting flange 40.

A second L-shaped mounting flange 60 has a first leg 62 fixed to the second end wall 32 of the housing unit 12 and a second leg 64 extending away from the second end wall 32 in the direction of the length dimension 34 of the housing unit 12. Second leg 64 of the second L-shaped mounting flange 60 has a first surface 66 located to be co-planar with the first wall 14 of the housing unit 12, a second surface 68 spaced apart from the first surface 66 of the second leg 64 of the second L-shaped mounting flange 60 in the direction of the thickness dimension 18 of the housing unit 12, and a thickness dimension 70 which extends between the first surface 66 of the second leg 64 of the second L-shaped mounting flange 60 and the second surface 68 of the second leg 64 of the second L-shaped mounting flange 60. Two fastener accommodating holes 72 and 74 are defined through the second leg 64 of the second L-shaped mounting flange 60.

Fasteners, such as bolts or the like (not shown) are accommodated in the fastener accommodating holes 52, 54, 72, 74 to fix the housing unit 12 to a panel in the motor vehicle. The housing unit 12 is easily stored under the dashboard of such a motor vehicle to be easily accessible when needed. The housing unit 12 is thus adapted to be mounted inside the passenger compartment of a motor vehicle using the first and second L-shaped mounting flanges 40, 60.

A power cord-accommodating passage 80 is defined through the first side wall 20 of the housing unit 12 near the second end wall 32 of the housing unit 12. A power cord door 82 is pivotally mounted on the first side wall 20 of the housing unit 12 adjacent to the power cord accommodating passage 80.

A motor unit access passage 84 is defined through the first side wall 20 of the housing unit 12 near the first end wall 30 of the housing unit 12.

A motor unit access passage door 86 is pivotally mounted on the first side wall 20 of the housing unit 12 adjacent to the motor unit access passage 84.

A hose-accommodating passage 88 is defined through the first side wall 20 of the housing unit 12 near the power cord door 82.

A motor 90 is located inside the housing unit 12 near the first end wall 30 of the housing unit 12. Motor 90 is of a type commonly used with a vacuum cleaner and includes a fluid inlet 92 and a fluid outlet 94.

A power cord 96 has a first end 97, electrically connected to the motor, and a second end 98. The power cord 96 extends out of the housing unit 12 via the power cord accommodating passage 80. The power cord 96 further includes an adapter plug 100 connected to the second end 98 of the power cord 96. The adapter plug 100 is sized and shaped to be received in a cigarette lighter receptacle of the motor vehicle and to be electrically connected to a power source associated with the motor vehicle when the plug 100 is received in the cigarette lighter receptacle.

A power cord-winding mechanism 102 is located inside the housing unit 12. The power cord 96 is wound around the power cord-winding mechanism 102 when the power cord 96 is in a stored condition, and is unwound from the power cord-winding mechanism 102 for use. The power cord-winding mechanism 102 includes a power cord-biasing mechanism 104 to bias the power cord-winding mechanism 102 into a condition which automatically winds the power cord 96 around the power cord-winding mechanism 102. The power cord 96 is unwound from the power cord-winding mechanism 102 against the bias of the power cord-biasing mechanism 104 for use.

A vacuum cleaner unit 110 is located inside the housing unit 12. Vacuum cleaner unit 110 includes a hose 112 having a first end 114 fluidically connected to the fluid inlet 92 of the motor 90 and a second end 116. The hose 112 extends from inside the housing unit 12 to outside the housing unit 12 through the hose-accommodating passage 88 with the second end 116 of the hose 112 being located outside the housing unit 12 when the hose 112 is in use.

A hose-winding mechanism 120 is located inside the housing unit 12. The hose 112 is wound around the hose-winding mechanism 120 when the hose 112 is in a stored condition, and the hose 112 is unwound from the hose-winding mechanism 120 for use. The hose-winding mechanism 120 includes a hose-biasing mechanism 122 which biases the hose-winding mechanism 120 into a condition which automatically winds the hose 112 around the hose-winding mechanism 120. The hose 112 is unwound from the hose-winding mechanism 120 against the bias of the hose-biasing mechanism 122 for use.

The power cord-winding mechanism 102 and the hose-winding mechanism 120 are each similar to the winding mechanisms disclosed in patents such as U.S. Pat. Nos. 2,169,734, 4,062,608, 5,074,483, 5,156,242, 5,230,481 and 5,402,814, the disclosures of which are incorporated herein by reference. Each of the winding mechanisms has a shaft, such as shaft 130 for the hose, around which the cord 96 and/or hose 112 is wound and a spring, such as spring 122 for the hose 112, wrapped around the shaft 130. One end of the spring abuts a fixed element, such as the housing unit 12, and the other end of the spring 122 is fixed to the shaft 130. The spring 122 biases the shaft 130 to rotate around a longitudinal axis of the shaft 130 in a direction to wind the hose 112 or the power cord 96 around the shaft 130. The spring 122 is tightened about the shaft 130 as the hose 112 or power cord 96 is pulled off the shaft 130 and the shaft 130 rotates in a direction counter to the direction of the bias from the spring 122. It is the existence of the winding mechanisms 1092, 120 that is important to the present invention, not the exact details thereof. Thus, the exact details of the winding mechanisms 102, 120 will not be described in detail except to refer to the just-referenced patents and to observe that one skilled in the art will be able to provide the winding mechanisms 102, 120 based on the teachings of the present disclosure and the teachings of the referenced patents.

A filter unit 140 is located inside the housing unit 12 adjacent to the fluid outlet 94 of the motor 90 and adjacent to the motor unit access passage 84. The filter unit 140 includes a lint trap unit 142 mounted on the housing unit 12. The lint trap unit 142 includes a drawer 144 slidably mounted on the second wall 16 of the housing unit 12. The drawer 144 is located adjacent to the fluid outlet 94 of the motor 90 and has an exhaust opening 146 defined therein. A filter element 148 is releasably located in the drawer 144. The filter element 148 is fluidically interposed between the fluid outlet 94 of the motor 90 and the exhaust opening 146 of the drawer 144 of the lint trap unit 142.

A plurality of vacuum cleaner attachments, such as attachment 150, and attachment 152, are also included in system 10. Each vacuum cleaner attachment is adapted to be releasably and fluidically connected to the second end 116 of the hose 112.

It is understood that while certain forms of the present invention have been illustrated and described herein, it is not to be limited to the specific forms or arrangements of parts described and shown.

What is claimed and desired to be covered by Letters Patent is:

1. A vacuum system for cleaning a motor vehicle comprising:
   a) a hollow housing unit which includes
      (1) a planar first wall,
      (2) a second wall,
      (3) a thickness dimension extending between the first wall and the second wall,
      (4) a first side wall,
      (5) a second side wall,
      (6) a width dimension extending between the first side wall and the second side wall,
      (7) a first end wall,
      (8) a second end wall,
      (9) a length dimension extending between the first end wall and the second end wall, and
      (10) vent holes defined through the first end wall;
   b) a first L-shaped mounting flange having a first leg fixed to the first end wall of said housing unit and a second leg extending away from the first end wall in the direction of the length dimension of said housing unit, the second leg of said first L-shaped mounting flange having a first surface located to be co-planar with the first wall of said housing unit, a second surface spaced apart from the first surface of the second leg of said L-shaped mounting flange in the direction of the thickness dimension of said housing unit, a thickness dimension extending between the first surface of the second leg of said first L-shaped mounting flange and the second surface of the second leg of said first L-shaped mounting flange, and two fastener-accommodating holes defined through the second leg of said first L-shaped mounting flange;
   c) a second L-shaped mounting flange having a first leg fixed to the second end wall of said housing unit and a second leg extending away from the second end wall in the direction of the length dimension of said housing unit, the second leg of said second L-shaped mounting flange having a first surface located to be co-planar with the first wall of said housing unit, a second surface spaced apart from the first surface of the second leg of said second L-shaped mounting flange in the direction of the thickness dimension of said housing unit, a thickness dimension extending between the first surface of the second leg of said second L-shaped mounting flange and the second surface of the second leg of said second L-shaped mounting flange, and two fastener-accommodating holes defined through the second leg of said second L-shaped mounting flange;
   d) said housing unit being adapted to be mounted inside the passenger compartment of a motor vehicle using said first and second L-shaped mounting flanges;
   e) a power cord-accommodating passage defined through the first side wall of said housing unit near the second end wall of said housing unit;
   f) a power cord door pivotally mounted on the first side wall of said housing unit adjacent to said power cord-accommodating passage;
   g) a motor unit access passage defined through the first side wall of said housing unit near the first end wall of said housing unit;
   h) a motor unit access passage door pivotally mounted on said first side wall of said housing unit adjacent to said motor unit access passage;
   i) a hose-accommodating passage defined through the first side wall of said housing unit near said power cord door;
   j) a motor located inside said housing unit near the first end wall of said housing unit, said motor including a fluid inlet and a fluid outlet;
   k) a power cord having a first end, electrically connected to said motor, and a second end, said power cord extending out of said housing unit via said power cord-accommodating passage and further including an adapter plug connected to the second end of said power cord, the adapter plug being sized and shaped to be received in a cigarette lighter receptacle of the motor vehicle and to be electrically connected to a power source associated with the motor vehicle when the plug is received in the cigarette lighter receptacle;
   l) a power cord-winding mechanism located inside said housing unit, the power cord being wound around the power cord-winding mechanism when the power cord is in a stored condition, the power cord being unwound from the power cord-winding mechanism for use, the power cord-winding mechanism including a power cord-biasing mechanism to bias the power cord winding mechanism into a condition which automatically winds the power cord around the power cord-winding mechanism, the power cord being unwound from said power cord-winding mechanism against the bias of the power-cord biasing mechanism for use; and
   m) a vacuum cleaner unit located inside said housing unit and including
      (1) a hose having a first end fluidically connected to the fluid inlet of said motor, and a second end, the hose extending from inside said housing unit to outside said housing unit through said hose-accommodating passage with the second end of the hose being located outside said housing unit when said hose is in use,
      (2) a hose-winding mechanism located inside said housing unit, the hose being wound around the hose-winding mechanism when the hose is in a stored condition, the hose being unwound from the hose-winding mechanism for use, the hose winding-mechanism including a hose-biasing mechanism to bias the hose-winding mechanism into a condition which automatically winds the hose around the hose-winding mechanism, the hose being unwound from said hose-winding mechanism against the bias of the hose-biasing mechanism for use,
      (3) a filter unit located inside said housing unit adjacent to the fluid outlet of said motor and adjacent to said filter unit access passage, the filter unit including
         (A) a lint trap unit mounted on said housing unit and which includes a drawer slidably mounted on the second wall of said housing unit, the drawer being located adjacent to the fluid outlet of said motor and having an exhaust opening defined therein, and
         (B) a filter element in the drawer, the filter element being fluidically interposed between the fluid outlet of said motor and the exhaust opening of the drawer of the lint trap unit, and (4) a plurality of vacuum cleaner attachments, each vacuum cleaner attachment being adapted to be releasably and fluidically connected to the second end of said hose.

2. A vacuum cleaner system for use in a motor vehicle comprising:
  a) a housing unit that is adapted to be mounted in a passenger compartment of a motor vehicle;
  b) a vacuum system located inside said housing unit and including a fluid inlet and a fluid outlet;
  c) a hose fluidically connected to the inlet of said vacuum system and extending out of said housing unit;
  d) a hose-winding mechanism located inside said housing unit and which includes a hose-biasing mechanism that automatically winds the hose into said housing unit when said hose is released, the hose being pulled out of said housing unit against the bias of the hose-biasing mechanism;
  e) a power cord electrically connected to said vacuum system and which extends out of said housing unit and which includes a plug that is sized and shaped to be received in a cigarette lighter receptacle of the motor vehicle to electrically connect said vacuum system to a power source of the motor vehicle via the cigarette lighter receptacle;
  f) a power cord-winding mechanism located inside said housing unit and which includes a power cord-biasing mechanism that automatically winds the power cord into said housing unit when said power cord is released, the power cord being pulled out of said housing unit against the bias of the power cord-biasing mechanism; and
  g) a filter unit mounted on said housing unit and fluidically connected to the fluid outlet of said vacuum system; and
  h) a plurality of vacuum cleaner attachments each of which is adapted to be fluidically and releasably mounted on said hose.

* * * * *